Figure 1:
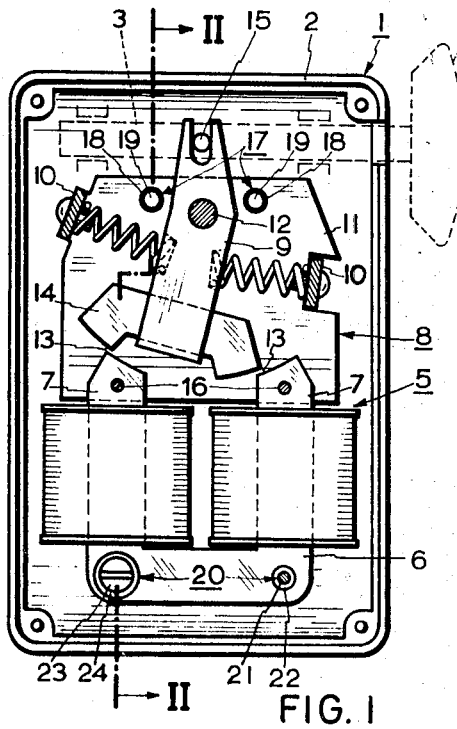

United States Patent
Jank

[15] 3,679,921
[45] July 25, 1972

[54] APPARATUS WITH AN OSCILLATING ARMATURE MOTOR

[72] Inventor: Reinhard Jank, Klagenfurt, Austria
[73] Assignee: U.S. Philips Corporation, New York, N.Y.
[22] Filed: March 1, 1971
[21] Appl. No.: 119,520

[30] Foreign Application Priority Data
March 2, 1970 Austria ..................A1908/70

[52] U.S. Cl.....................................310/37, 310/38, 310/51
[51] Int. Cl. ...........................................................H02k 1/34
[58] Field of Search.....................310/37, 21, 29, 38, 36, 47, 310/27, 22, 51

[56] References Cited

UNITED STATES PATENTS

| | | |
|---|---|---|
| 3,043,970 | 7/1962 | Hatten et al. .........................310/51 X |
| 3,437,852 | 4/1969 | Cox .........................................310/36 |
| 3,571,633 | 3/1971 | Timmerman ...........................310/29 |
| 3,521,093 | 7/1970 | Harms...................................310/37 X |
| 3,435,300 | 3/1969 | Sato.....................................310/29 X |
| 3,272,998 | 9/1966 | Spohr...................................310/29 X |

Primary Examiner—J. V. Truhe
Assistant Examiner—B. A. Reynolds
Attorney—Frank R. Trifari

[57] ABSTRACT

Apparatus including a housing, a tool movable in a guide in the housing, and an electric motor of oscillating armature type mounted in the housing and arranged to drive the tool, the motor having a stator, a carrier fixed to the stator at the pole end thereof, and an oscillating armature lever pivoted on the carrier, the carrier being fixed relatively to the housing by carrier positioning means, and the end of the stator remote from the oscillating armature lever being held to the housing by a clamp connection which permits forced relative movement between the stator and the housing.

8 Claims, 5 Drawing Figures

PATENTED JUL 25 1972

3,679,921

SHEET 1 OF 2

INVENTOR

Reinhard W. J. F. Jank

BY Watson, Cole, Grindle & Watson
ATTORNEY

APPARATUS WITH AN OSCILLATING ARMATURE MOTOR

The invention relates to an apparatus with an oscillating armature motor, e.g., dry shaving apparatus, massage apparatus, or the like, in which the oscillating armature motor serves to drive a component which is formed as a tool, guided along a predetermined path in an apparatus housing, and has a stator, to the pole end of which a carrier is fixed, on which the oscillating armature lever of the motor is pivoted, while the stator in its turn, at its end remote from the oscillating armature lever, is held to the housing of the apparatus by at least one screw connection. In apparatus of this kind, the oscillating armature motor, consisting of the stator, the oscillating armature lever, and the carrier for pivoting of the oscillating armature lever, constitutes a constructional unit, which can be installed as such into the apparatus housing. For example, it is in this connection already known, to connect this unit through rubber buffers with the housing or, as mentioned already above, to hold the stator to the housing of the apparatus, at its end remote from the oscillating armature lever, with at least one screw connection. In the first-mentioned case, the position of the oscillating armature lever relative to the tool driven by it, which has to follow a predetermined path in the apparatus housing, is relatively uncertain and inexact; in the second case the relative position of the unit relative to the housing is only accurately fixed in the neighborhood of the screw connection, but not at the driving end of the motor.

The invention now aims, in an apparatus of the kind mentioned at the beginning, to produce a particularly satisfactory connection between the oscillating armature motor and the apparatus housing, in which the above-mentioned defects are avoided. According to the invention, for fixing the position of the carrier relative to the housing, a carrier positioning means is provided between the carrier and the housing, and the screw connection for holding the stator to the housing is formed as a clamp connection, which permits a forced relative movement between the stator and the housing. By this means it is achieved that the position of the driving side of the oscillating armature motor, i.e., the relative position of the oscillating armature lever relative to the tool, which has to follow a predetermined path in the housing of the device, is determined exclusively by the positioning means between the carrier and the housing, so that the lever arm transmitting the oscillating motion to the tool always remains the same. Furthermore, the advantage is obtained, that, upon a relative change of length of the housing, for example occurring under extreme temperature or humidity conditions, in consequence of the circumstances that the stator is merely held by a clamp connection which permits a forced relative movement between the stator and the housing, the stator is not displaced in its position relative to the carrier and thus also relative to the oscillating armature lever, so that the air gap between the stator and the oscillating armature lever always remains the same, and thus the functioning of the motor is not disturbed or worsened. In addition it has also appeared that the measures according to the invention bring substantial advantages with them also on violent shaking of the apparatus, for example if the apparatus is dropped, because the position of the oscillating armature motor in the apparatus and the air gap of the oscillating armature motor remain unaltered.

It is advantageous to hold the carrier also, like the stator, by a clamp connection to the housing, in addition to the positioning means, so that, despite a possible relative movement relative to the housing, an especially secure position of the entire oscillating armature motor in the housing is obtained. In itself, the clamp connection can naturally be constructed in the most varied ways, e.g., like a clamp, in that a beam, which presses the part to be held against the housing, itself cooperates through a screw with the housing. A particularly simple construction is however achieved, if, as the clamp connection, there serves at least one screw cooperating with the housing, which extends with play through a bore of the part to be clamped, namely the stator and/or the carrier, and firmly clamps the latter to the housing by means of its screw head.

It has proved to be particularly advantageous, if the positioning means between the carrier and the housing is provided in the neighborhood of the pivot point of the oscillating armature lever on the carrier. By this means it is achieved that the position of the oscillating armature lever relative to the tool is defined particularly exactly. In an apparatus, in which the oscillating armature lever is pivoted on an axle provided on the carrier, it has proved advantageous in this connection, if, to form the positional connection, the axle has an extension, which extends with a close fit into a recess provided in the housing.

The invention will be explained in more detail below with reference to the drawings, in which some constructional examples of it are shown, to which however it is not restricted.

FIG. 1 shows in longitudinal section; and

Figure 2:
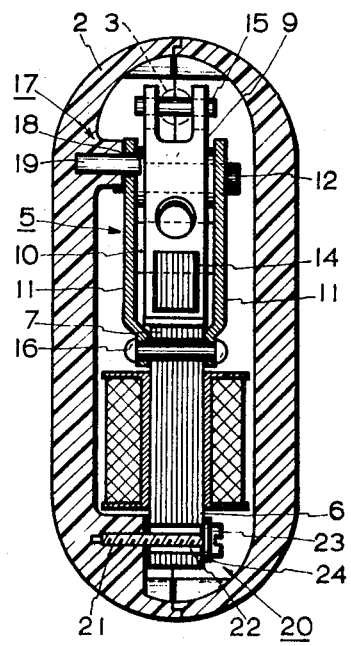

FIG. 2 in cross section on the line II—II in FIG. 1 a massage apparatus with a carrier for the oscillating armature lever positionally fixed at two places to the housing.

Figure 3:
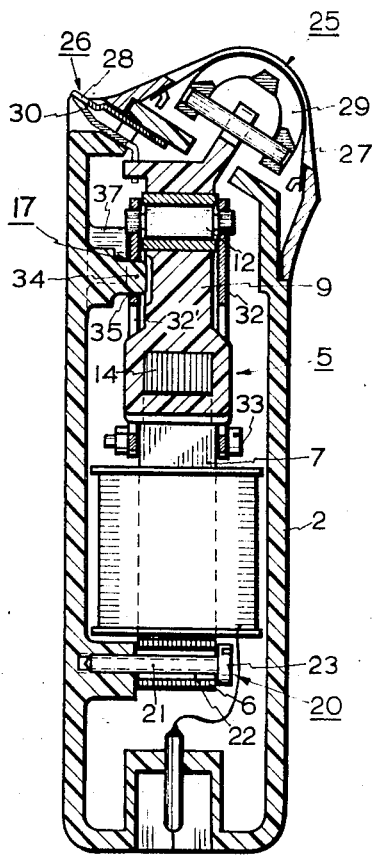

The FIG. 3 a dry shaving apparatus is shown in cross section with a positional connection of the carrier with the oscillating armature lever achieved by an addition to the housing.

Figure 4:
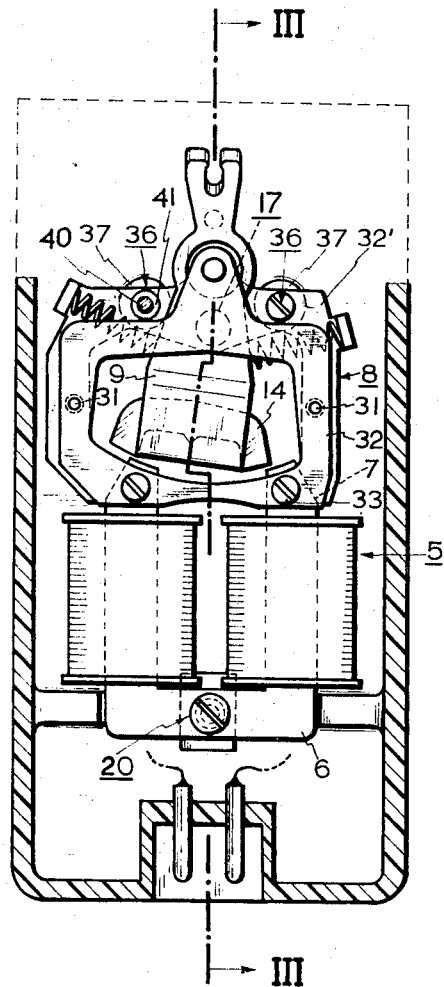

FIG. 4 shows in this connection the parts which are relevant to the invention, in longitudinal section.

Figure 5:
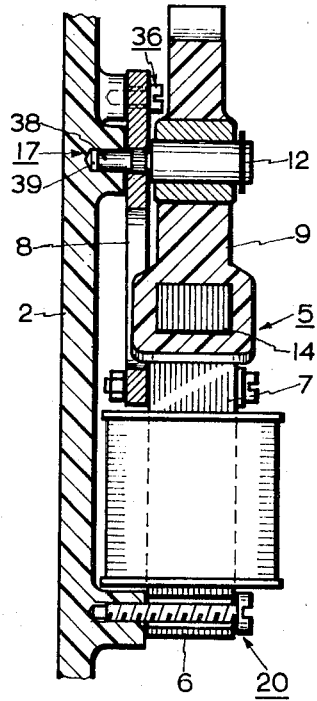

In FIG. 5 a constructional example is shown, in which the positional connection of the carrier with the housing takes place with the aid of the axle of the oscillating armature lever.

In FIG. 1 a massage apparatus is indicated at 1, which has a massage tool 4 shown only schematically, arranged on a tappet 3 which is journalled to reciprocate in the housing 2 of the apparatus. For driving this tool with a reciprocating motion, there is a usual oscillating armature motor 5 with a stator 6; to the pole end 7 a carrier 8 is fixed, and an oscillating armature lever 9 is pivoted about an axis on the carrier 8 and pivots to define a plane generally normal to this axis. The carrier 8 is at the same time formed as two plates 11 parallel to one another, each extending alongside the pole shoes of the stator 6, and connected together by bars 10, between which extends an axle 12 for pivoting of the oscillating armature lever 9. At the end of the oscillating armature lever directed towards the stator 6, there is provided the armature 14, cooperating with the pole shoes 7 of the stator and forming an air gap 13 with them, whereas the other end of the oscillating armature lever is formed fork-shaped and cooperates with a pin 15 extending through the tappet 3, for driving the tool 4. The fixing of the carrier 8 to the pole shoes 7 takes place with rivets 16 inserted in the plates 11 and the ends of the pole shoes, so that it is very firm, and no change of position of the carrier 8, and hence of the armature 14, is permitted relative to the ends of the pole shoes 7.

According to the invention, there is now provided between the carrier 8 and the housing 2 of the apparatus a carrier positioning means 17 free of play, which accurately fixes the position of the carrier relative to the housing, in particular in the neighborhood of this point of connection. For this purpose the carrier 8 has in one of its plates 11, near the axle 12, two bores 18 with which it is forced with a close fit onto two corresponding pins 19 pressed into one of the halves of the housing 2. Advantageously the carrier is also supported on the housing in the neighborhood of this positional connection. For holding the oscillating armature motor to the housing there is provided a clamp connection 20, which grips the end of the stator remote from the oscillating armature lever 9. This clamp connection consists of two screws 21 cooperating with the housing, which each extend through a bore 22 of the stator. The bores have a greater diameter than the shanks of the screws 21. In this way the stator 6 is pressed against the housing by means of the heads 23 of the screws 21, through washers 24 which are also supplied in this constructional example, so that it, and thereby the entire motor, is held to the housing. For simple assembly of the device, the clamping connection is advantageously provided on the same half of the housing as the carrier positioning means. In that clearance is provided between the screw shanks and the inner walls of the bores in the stator, and consequently the stator is only clampingly held to the housing, a forced relative movement is possible between the stator and the housing at the clamping position, without dimensional changes thereupon taking place in the motor, i.e., without for example its air gap or the effective lever arm for the drive of the tool altering.

By these measures it is achieved that, even under unfavorable conditions, the motor does not change its properties, and the driving conditions for the tool always remain the same. This is true even for extreme variations in circumstances, such as high temperature and high humidity, and also for extreme mechanical conditions, such as during an unintended dropping of the apparatus. Of course by this means under normal operating conditions also a truly defined cooperation of the driving part of the motor with the tool will always be ensured.

If desired, rubber buffers can be provided on the side of the housing opposite the carrier positioning means, cooperating also with the corresponding plate 11 of the carrier, so as to damp possible vibrations of the stationary motor parts, and as the case may be to ensure a secure engagement of the carrier with the half of the housing which carries the carrier positioning means.

The constructional example according to FIGS. 3 and 4 shows a dry shaving apparatus with a shaving part 25, and a long hair cutting part 26, of which the lower cutters 29 and 30, cooperating with stationary upper cutters, a perforated cutter foil 27 and a cutter comb 28, are driven in unison from the oscillating armature lever 9 of the oscillating armature motor 5 of the apparatus. The oscillating armature lever is again pivoted on a carrier 8, which consists of two plates 32 and 32' connected together by bolts 31, the plates being each laterally fixed with screws 33 to the pole ends 7 of the stator 6, and in each of which is pressed an end of an axle 12 extending perpendicular to the plates, for the oscillating armature lever. The screw connection 33 is made very firm, so that the relative position of the stator and carrier cannot alter.

The carrier positioning means 17 provided for fixing the position of the carrier 8 relative to the housing 2 consists of a projection 34 directly provided on the housing, on which the carrier is pushed with a close fit by means of a bore 35 provided in the plate 32'.

The stator 6 is also held to the housing 2 with a clamp connection 20 at its end remote from the oscillating armature lever 9, for which purpose here a single screw 21 is provided, which passes through the stator in a bore 22 with greater diameter than the screw shank, and presses it clampingly by the screw head 23 against the housing.

In addition to the positioning means 17 there is, in this constructional example, also an additional clamp connection 36 provided for the carrier 8 with the housing. This clamp connection 36 is formed by two screws 40, which pass through the plate 32' of the carrier 8 in bores 41, which have a greater diameter than the screw shanks. These screws are threadable into projections 37 on the housing, which at the same time serve as abutments for the carrier. In this way the plate 32' is clamped fixedly to the housing 2 by means of the screw heads 42.

The operation of this construction is absolutely analogous to that already described for the constructional example according to FIGS. 1 and 2.

The constructional example according to FIG. 5 shows an oscillating armature motor 5, in which the carrier 8 which carrier the oscillating armature lever 9, and which is fixedly connected with the pole ends of the stator 6 of the motor, is formed by a single plate, in which the axle 12 of the oscillating armature lever is pressed. The positional connection 17 of the carrier 8 with the housing 2 for exact fixing of its position relatively to the latter is, in the constructional example according to FIG. 5, achieved in that the axle 12 provided for pivoting the oscillating armature lever has a projection 38, which extends into a corresponding bore 39 in the housing 2. To hold the stator 6 to the housing there also serves a clamp connection 20, and for additional holding of the carrier 8 to the housing a similar clamp connection 36.

In that the positional connection of the carrier with the housing is effective directly on the axle of the oscillating armature lever, an optimum fixing is achieved of the lever arm of the oscillating armature lever which drives the tool.

Of course with reference to the construction of the positional connection, free of play, and the clamp connection which permits relative movement, there are also a series of variations of the constructional examples described above, without going outside the scope of the invention.

I claim:
1. Apparatus including a housing, a tool movable in a guide in the housing, and an electric motor of oscillating armature type mounted in the housing and arranged to drive the tool, the motor having a stator, a carrier fixed to the stator at the pole end thereof, and an oscillating armature lever pivoted on the carrier, the carrier being fixed relatively to the housing by carrier positioning means, and the end of the stator remote from the oscillating armature lever being held to the housing by a clamp connection which permits forced relative movement between the stator and the housing.

2. Apparatus according to claim 1, in which the carrier is also held to the housing by a second clamp connection.

3. Apparatus according to claim 1, in which the clamp connection comprises at least one headed-screw cooperating with the housing, which extends with play through a bore in the part which is to be held, and firmly clamps the latter to the housing by means of its head.

4. Apparatus according to claim 1, in which the positioning means is near the pivot point of the oscillating armature lever on the carrier.

5. Apparatus according to claim 4, in which the oscillating armature lever is pivoted on an axle arranged on the carrier, and the positioning means comprises an extension of the axle, which extends with a close fit into a recess in the housing.

6. Apparatus comprising a housing, an output member mounted to the housing and movable relative thereto, an oscillating armature type electric motor mountable in said housing and engageable to said output member for driving same, the motor including a stator with near and remote parts, a carrier fixed to the near part of the stator, and an oscillating armature pivotal on said carrier via a pivot axis, the armature movement defining a plane generally normal to said axis, the apparatus further comprising first means for positioning the carrier fixedly relative to the housing, and a clamp connection means for securing said remote part of the stator to the housing while permitting forced relative movement of said stator in said plane or in a plane generally parallel thereto relative to the housing.

7. Apparatus according to claim 6 wherein said stator remote part includes a bore therethrough, and said clamp connection means comprises a fastener having a shank part extending through said bore and having a diameter smaller than that of said bore for permitting said forced relative movement of the stator.

8. Apparatus according to claim 6 further comprising a second clamp connection means for securing said carrier to the housing while permitting relative movement of said carrier in said plane or in a plane generally parallel thereto relative to the housing.

* * * * *